US012286336B2

(12) United States Patent
Dobson et al.

(10) Patent No.: US 12,286,336 B2
(45) Date of Patent: Apr. 29, 2025

(54) GASEOUS LIQUID DISPENSER AND METHOD OF PROVISION OF A GASEOUS LIQUID

(71) Applicant: BEERBOXCO PTY LTD, Balwyn (AU)

(72) Inventors: Nick Dobson, Mont Albert (AU); Peter Mornement, Balwyn (AU)

(73) Assignee: BEERBOXCO PTY LTD, Balwyn (AU)

( * ) Notice: Subject to any disclaimer, the term of this patent is extended or adjusted under 35 U.S.C. 154(b) by 0 days.

(21) Appl. No.: 17/596,974

(22) PCT Filed: Jun. 26, 2020

(86) PCT No.: PCT/AU2020/050664
§ 371 (c)(1),
(2) Date: Dec. 22, 2021

(87) PCT Pub. No.: WO2020/257873
PCT Pub. Date: Dec. 30, 2020

(65) Prior Publication Data

US 2022/0250893 A1 Aug. 11, 2022

(30) Foreign Application Priority Data

Jun. 26, 2019 (AU) ................................ 2019902235

(51) Int. Cl.

| | |
|---|---|
| ***B67D 1/04*** | (2006.01) |
| ***B65D 30/24*** | (2006.01) |
| ***B65D 35/22*** | (2006.01) |
| ***B65D 35/28*** | (2006.01) |
| ***B65D 35/46*** | (2006.01) |
| ***B65D 75/38*** | (2006.01) |
| ***B65D 75/58*** | (2006.01) |

(Continued)

(52) U.S. Cl.
CPC ........... *B67D 1/0462* (2013.01); *B65D 31/14* (2013.01); *B65D 35/22* (2013.01); *B65D 35/28* (2013.01);
(Continued)

(58) Field of Classification Search
CPC ................ B67D 1/0462; B67D 1/0835; B67D 2001/0828; B67D 2001/0093;
(Continued)

(56) References Cited

U.S. PATENT DOCUMENTS 4,796,788 A * 1/1989 Bond ..................... B67D 1/045 222/105
4,923,095 A * 5/1990 Dorfman ................ B67D 1/045 222/394
(Continued)

FOREIGN PATENT DOCUMENTS

CN 102574673 A 7/2012
EP 0276994 A2 8/1988
(Continued)

OTHER PUBLICATIONS

International Preliminary Report on Patentability received for PCT Patent Application No. PCT/AU2020/050664, mailed on Jan. 6, 2022, 12 pages.
(Continued)

*Primary Examiner* — Frederick C Nicolas
(74) *Attorney, Agent, or Firm* — Workman Nydegger

(57) ABSTRACT

A collapsible bag for use in dispensing gaseous fluids, the collapsible bag including three collapsible enclosures. Two of the collapsible enclosures have respective fluid paths extending from internal to external of the outer enclosure. The configuration of the food quality of an inner enclosures and the integrity of the third outer enclosure and as well as the relative volume of one inner enclosure to the outer enclosures effects the dispensing mechanism of the pressure which allows transfer of the pressure without fluid interaction to another of the at inner collapsible enclosures and selective dispensing.

13 Claims, 14 Drawing Sheets

(51) Int. Cl.
*B67D 1/00* (2006.01)
*B67D 1/08* (2006.01)

(52) U.S. Cl.
CPC ............ *B65D 35/46* (2013.01); *B65D 75/38* (2013.01); *B65D 75/5877* (2013.01); *B67D 1/0004* (2013.01); *B67D 1/045* (2013.01); *B67D 1/0804* (2013.01); *B67D 1/0807* (2013.01); *B67D 1/0832* (2013.01); *B67D 1/0835* (2013.01); *B67D 1/0842* (2013.01); *B67D 2001/0089* (2013.01); *B67D 2001/0092* (2013.01); *B67D 2001/0093* (2013.01); *B67D 2001/0487* (2013.01); *B67D 2001/0827* (2013.01); *B67D 2001/0828* (2013.01); *B67D 1/0857* (2013.01); *B67D 1/0877* (2013.01); *B67D 2210/0006* (2013.01)

(58) Field of Classification Search
CPC .. B67D 1/0804; B67D 1/0807; B67D 1/0004; B67D 1/045; B67D 1/0832; B67D 1/0842; B67D 1/0857; B67D 1/0877; B67D 2001/0089; B67D 2001/0092; B67D 2001/0487; B67D 2001/0827; B67D 2210/0006; B65D 77/067; B65D 35/22; B65D 35/28; B65D 35/46; B65D 75/38; B65D 31/14; B65D 75/5877
See application file for complete search history.

(56) References Cited

U.S. PATENT DOCUMENTS

| | | | | | |
|---|---|---|---|---|---|
| 5,137,175 | A * | 8/1992 | Kowalski | B67D 1/0462 | 222/105 |
| 8,181,822 | B2 * | 5/2012 | Doelman | B67D 1/1245 | 222/394 |
| 9,051,167 | B2 * | 6/2015 | Burge | B67D 1/0831 | |
| 10,266,384 | B2 * | 4/2019 | Valles | B67D 1/0857 | |
| 10,370,236 | B2 * | 8/2019 | Doelman | B67D 1/1252 | |
| 11,027,960 | B2 * | 6/2021 | Kraenzle | B67D 1/0462 | |
| 2009/0057347 | A1 * | 3/2009 | Leys | B65D 83/0055 | 222/105 |
| 2009/0236361 | A1 * | 9/2009 | Doelman | B65D 47/242 | 222/335 |
| 2013/0175304 | A1 * | 7/2013 | Peirsman | B67D 1/0835 | 222/105 |
| 2014/0001205 | A1 * | 1/2014 | Hodges | B65D 83/0055 | 222/400.7 |
| 2017/0240409 | A1 | 8/2017 | Valles et al. | | |
| 2018/0162714 | A1 | 6/2018 | Doelman et al. | | |

FOREIGN PATENT DOCUMENTS

| | | | |
|---|---|---|---|
| GB | 1233701 | A | 5/1971 |
| GB | 2356854 | A | 6/2001 |
| WO | 2018113980 | A1 | 6/2018 |
| WO | 2020020752 | A1 | 1/2020 |

OTHER PUBLICATIONS

International Search Report and Written Opinion received for PCT Patent Application No. PCT/AU2020/050664, mailed on Nov. 20, 2020, 17 pages.
European Supplementary Search Report, mailed Jun. 29, 2023, from European patent application No. 20831301.5, 8 pages.
Chinese First Office Action, mailed Jun. 12, 2023, from Chinese patent application No. 202080044038.2, 9 pages.

* cited by examiner

GASEOUS LIQUID DISPENSER AND METHOD OF PROVISION OF A GASEOUS LIQUID

The present application is a U.S. National Stage of International Application No. PCT/AU2020/050664, filed on Jun. 26, 2020, designating the United States and claiming the priority of Australian Patent Application No. AU2019902235 filed with the Australian Patent Office on Jun. 26, 2019. All of the aforementioned applications are incorporated herein in their respective entireties by this reference.

FIELD OF THE INVENTION

The present invention relates to a gaseous drink dispenser and a method of provision of a gaseous drink and in particular to a portable gaseous drink dispenser and a method of provision of gaseous drink at a non-commercial location such as a household.

The invention has been developed primarily for use as part of a beer dispenser that can be readily relocatable and method of provision of beer at location of choice and will be described hereinafter with reference to this application. However, it will be appreciated that the invention is not limited to this particular field of use.

BACKGROUND OF THE INVENTION

A gaseous drink is a food quality drink which has a gaseous element due to its manner of production or by the addition of gas. Usually that gas is a carbonation or other gas that may not affect the drink or enhances the drink. Such gas can be mixtures of gases such as for example 30% CO2-70% Nitrogen or 75% CO2-25% Nitrogen.

In the case of beer the act of forming the beer requires fermentation. This provides natural gas formation to provide a gaseous drink.

The dispensing of beer is usually undertaken at premises that are particularly set up for beer dispensing. This includes public bars (pubs), hotels, bars etc. At such venues the beer dispenser and method of provision of beer is usually by large heavy metal kegs in which the beer is retained under pressure. These kegs are made from stainless steel or aluminium.

The standard keg size is usually 50 litres and the vast majority of keg beers are supplied in this keg size. There are also smaller 30 litre kegs but these are usually reserved for more specialist or premium beers.

A keg has a single opening centrally on a top end, called a "bung." A tube called a "spear" extends from the opening to the other end. There is a self-closing valve that is opened by the coupling fitting which is attached when the keg is tapped. There is also an opening at the top of the spear that allows gas (usually carbon dioxide) to drive the beer out of the keg. The coupling fitting has one or two valves that control the flow of beer out of and gas into the keg. The keg must be in the upright position, that is, with the opening on top, for the beer to be dispensed.

The 50 litre keg when full is well over 50 kilograms due to the weight of the beer being over 50 kilograms and then the weight of the heavy metal container. Even when empty it is a reasonably heavy container as there remains the weight of the heavy metal container. The heaviness of the container allows for reuse due to its avoidance of damage even when rough handled as it is being loaded on and off delivery trucks and being dropped or rolled into cellars below the venue (such as pubs) through delivery chutes or delivery drops or cellar stairs accessible from external of the building.

The design of the pub buildings shows a range of limitations of the kegs. The pub buildings generally include cellars on the floor below the floor of serving of the beer. Further there is usually a direct entry by a trap door from outside of the building to the cellar to directly deliver the kegs to the cellar. The kegs stay in the cellar and are connected by piping or tubing to the serving outlets at the bar on the serving floor above.

Due to the extensive weight of kegs it is necessary that such cellar systems are provided. It is not appropriate to be rolling 50 litre kegs through the main premises. Therefore present systems have geographic problems and problems of needing network connection that extends from floor to floor of a premises.

However, the other problem is the volume of kegs. The volume of a 50 litre container remains as a 50 litre volume container whether it is filled with air before the beer is inserted or filled with beer or filled with air after the beer has been dispensed. Further the heaviness of the empty container is a limitation that restricts its use.

To dispense beer from a keg it is necessary to pump in a beer gas. This allows kegs to be connected to a draught system under higher pressure without over carbonating the beers. In order to do that without either losing carbonation in the beer or over carbonating the beer, nitrogen is generally mixed with carbon dioxide. Usually that gas is a carbonation or other gas or mixture that may not affect the drink or enhances the drink. Such gas can be mixtures of gases such as for example 30% CO2-70% Nitrogen or 75% CO2-25% Nitrogen. However, using gas in direct contact with the gaseous drink requires tight and precise controls and precise beer gas as the dispensing gas. Even then the gaseous drink is often tainted. It is particularly a problem for dispensing home brews or microbrewery brews that are not consistent.

It can therefore be seen that for a dispensing system that is in contact with the dispensed liquid it is essential to be careful with the contact gas. Even with the selection of the correct gas there is substantial difference in remaining volume in the fixed volume keg and thereby substantial difference in pressure from a full keg to a nearly empty keg. This results in over gassing at the end of a keg is a wastage of a sizeable residual quantity.

It can be seen that known prior art beer dispenser and method of provision of beer has the problems of:

a) the unchanging volume of the keg
b) the heaviness of the keg when full or empty
c) the restrictive delivery in keg volumes
d) the need for a predefined delivery venue
e) the restrictive use of the beer delivery system
f) the need for a large volume to be dispensed
g) the difficulty in dispensing all of the volume
h) the need for control of the type gas if it is contact with the drinkable liquid and to maintain the liquid safe to drink and not tainted;
i) the inability to use other gases that even could provide secondary assistance such as cooling or heat exchanging.

The present invention seeks to provide a gaseous drink dispenser and a method of provision of a gaseous drink and in particular to a portable gaseous drink dispenser and a method of provision of gaseous drink at a non-commercial location such as a household and in particular a beer dispenser and method of provision of beer, which will overcome or substantially ameliorate at least one or more of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect of the present invention, there is provided a collapsible bag for use in a gaseous drink dispenser and which is preferably a beer dispenser. The configuration and structure of the bag allows for dispensing beer from bag of beer which can be by a method of provision of beer which is provided a beer dispenser.

The invention of beer dispenser and method of provision of beer provides the benefit of not requiring heavy metal kegs and therefore changing the transportability when empty before use and when empty after use while being effective when in use.

According to a second aspect of the present invention, a beer dispenser and a method of provision of beer is provided by a beer bag and structure to allow transport in flat pack. This provides the benefit of being able to readily transport the beer bag to location in vastly greater quantities as the volume is negligible compared to the consistent large volume of a metal keg.

According to a third aspect of the present invention, a beer dispenser and a method of provision of beer is provided having a valve structure for valving from a beer bag to a beer dispenser. This has substantial benefits in that it allows for a simple compact system which does not require extensive fixed plumbing and is therefore readily portable as a system.

In one form of the bag of the invention there is a collapsible bag comprising at least three collapsible enclosures; wherein one of the at least three collapsible enclosures forms an outer enclosure and at least two of the at least three collapsible enclosures are within the outer enclosure; and wherein each of the at least two collapsible enclosures have respective fluid paths extending from external of the outer enclosure.

Preferably the at least two collapsible enclosures are adjacent each other within the outer enclosure. However in an alternative form a first enclosure of the at least two collapsible enclosures is within a second enclosure of the at least two collapsible enclosures and both are within the outer enclosure.

A first enclosure of the at least two collapsible enclosures is sized to have an expanded volume similar to an expanded volume of the outer enclosure wherein pressure gas applied into first enclosure will displace liquid in second enclosure for exiting along fluid path to external of the outer enclosure.

In a particularly improved form the collapsible bag has at least part of each of the fluid paths having at least partially concentrically aligned. In this way a single multipath valve can be attached.

In a particularly improved form the collapsible bag has the at least three collapsible enclosures collapse flat. In this way the bag is flat when transported, filled in enlarged form and flat when used and being sent for re-using and refilling.

The collapsible bag is substantially flat, when the at least three collapsible enclosures are collapsed, and can have end seams at opposing ends such that when full makes a substantially pillow shape.

The outer enclosure has an integrity to hold a pressure within. This outer enclosure can include high tensile synthetic fibre such as Kevlar. The outer enclosure can has an integrity to hold a pressure within of <60 psi. and preferably within of substantially in the range of 35 to 50 psi.

The inner enclosure includes an inner layer of FDA approved food safe polyethylene such as Mylar.

The configuration of the collapsible bags and the integrity of the outer enclosure and food quality of an inner enclosure as well as the relative volume of one inner enclosure to the outer enclosures effects the dispensing mechanism of the pressure which can be received in at least one of the at least three collapsible enclosures and the integrity of the outer bag allows transfer of the pressure without fluid interaction to another of the at least three collapsible enclosures.

The fluid paths of the at least two collapsible enclosures extend to external of the outer enclosure at a common outlet of the outer enclosure.

Preferably for most benefit the fluid paths are formed at least partly by a valve. In one form the fluid paths are formed to receive a valve. This can be by the fluid paths being formed to receive a valve in a snap fit arrangement. However the fluid paths can be formed integral with a valve.

Most beneficially and most inventive is for the valve to be a multi-pathway valve forming a plurality of separate pathways with each pathway forming at least part of one of the fluid paths. In particular, at least part of the fluid paths formed by the valve are at least partially concentrically aligned.

The collapsible bag with the valve forms part of the first fluid path leading to the first enclosure forming a beer compartment of flexible bag; and forms part of the second fluid path leading to the second enclosure forming a pressure compartment of flexible bag. The first enclosure of the at least two collapsible enclosures is sized to have an expanded volume similar to an expanded volume of the outer enclosure wherein pressure gas applied into the first fluid path into the first enclosure will displace liquid in the second enclosure for exiting along second fluid path to external of the outer enclosure and connection to a dispenser.

In one form the invention provides a beer dispenser and a system of provision of beer including a dispenser for use in dispensing beer comprising:

a) a first channel for selective connection to at least one collapsible bag having a first flexible compartment for holding beer;

b) a delivery port fluidly connected to the first channel for providing selective delivery of beer from the at least one collapsible bag allowing each of a plurality of users to provide a user defined delivery amount of beer;

c) a second channel for selective connection to a second flexible compartment of the at least one collapsible bag;

d) at least one pressure means connectable by the second channel to the second flexible compartment of the at least one collapsible bag for exerting pressure on the first flexible compartment to cause flow of the beer to the delivery port;

e) wherein the dispenser can selectively receive and hold at least one collapsible bag of beer when full and following dispensing of the beer allow for removal of the at least one collapsible bag of beer in a collapsed substantially empty state.

The delivery port includes a levered tap.

Preferably a part of the first channel includes a delivery channel which includes a heat transfer portion passing a cooling mechanism to effect a cooling of the delivered beer.

The delivery channel can include a helical coil for enhancing heat transfer.

In one form the first channel includes a manifold connectable to a plurality of the at least one collapsible bag.

The second channel can also include a manifold connectable to a plurality of the at least one collapsible bag.

The first and second channel includes a single manifold having a first liquid flow line and a second pressured gas flow line wherein the single manifold is connectable to a plurality of the at least one collapsible bag.

The dispenser includes a valve means for connection between the first channel and the at least one collapsible bag for controlling the flow of liquid such as beer from the at least one collapsible bag.

Preferably a valve means is used for connection between the second channel and the at least one collapsible bag for controlling the flow of pressurised gas into the at least one collapsible bag.

In one form the valve means has multi-connections for connection between the first channel and the at least one collapsible bag for controlling the flow of liquid such as beer from the at least one collapsible bag; and for connection between the second channel and the at least one collapsible bag for controlling the flow of pressurised gas into the at least one collapsible bag.

Preferably the valve means is selectively attachable to the at least one collapsible bag and the first and/or second channel are selectively attachable to the valve means.

The dispenser for use in dispensing beer can include a pressure source connectable to the second channel for providing about 80 to 140 psi.

Preferably the pressure source is connectable to the second channel for providing pressured gas to effect a pressure in the second flexible compartment of up to about 140 psi.

Preferably the pressure source connectable to the second channel for providing flow and dispensing of the liquid such as beer from the first channel at a dispensing pressure of about 10 psi.

The opening of the delivery port effects the release of pressured gas from the at least one pressure means connected to the second channel to feed the pressured gas into the second flexible compartment of the at least one collapsible bag for exerting pressure on the first flexible compartment to cause flow of the beer from the first flexible compartment of the at least one collapsible bag to the delivery port.

Also in accordance with the invention there is provided a multi-path valve means between the first channel and the at least one collapsible bag having a first flexible compartment for holding beer and between the second channel and the at least one collapsible bag having a second flexible compartment for receiving pressured gas wherein in use the opening of the delivery port:

a) releases pressure in the first channel that effects opening of the pressured gas path of multi-path valve means to allow pressured gas to be received into the second flexible compartment of the at least one collapsible bag; and b) effects opening of the fluid path of the multi-path valve means to allow fluid such as beer to be expelled from the first flexible compartment of the at least one collapsible bag by the exerted pressure on the first flexible compartment by the pressurised second flexible compartment to cause flow of the beer to the delivery port; and c) wherein in use the closing of the delivery port:

d) traps pressure in the first channel that effects closing of the pressured gas path of multi-path valve means to stop pressured gas being received into the second flexible compartment of the at least one collapsible bag; and e) effects closing of the fluid path of the multi-path valve means to stop fluid such as beer being further expelled from the first flexible compartment and stops flow of the beer to the delivery port.

A dispenser for use in dispensing beer according to a version of the invention has the beer bag including a plurality of characteristics selected from:

i) being collapsible;

ii) being manually transportable;

iii) having a plurality of pressure controlled inner volumes;

iv) having at least one outer volume able to hold the plurality of pressure controlled inner volumes;

v) having the at least one outer volume having a substantially constant maximum volume at a maximum pressure;

vi) including a valve for feeding in and out liquid such as beer from one pressure controlled inner volumes;

vii) including a valve for feeding in and out pressure fluid from one pressure controlled inner volumes;

viii) having a valve for both feeding in and out liquid such as beer from one pressure controlled inner volumes and effecting feeding in and out pressure fluid from one pressure controlled inner volumes;

ix) having a pressure source providing pressure to effect transfer from the at least one inner volume to the delivery port;

x) having a pressure source providing pressure to the transferred liquid to maintain an acceptable aerated drink pressure of the liquid at the delivery port.

Also in accordance with the invention there is provided a collapsible bag for use in a dispenser for dispensing beer wherein the bag includes:

a) an outer flexible compartment having a substantially constant maximum volume at a maximum pressure;

b) at least a first inner flexible compartment for receiving and holding liquid such as beer;

c) at least a second inner flexible compartment acting as a pressure bag for selectively receiving pressured gas and by controlling the flow of pressurised gas into the second inner compartment for exerting pressure on the first flexible compartment to cause flow of the beer from the collapsible bag;

d) a connection to a valve means for controlling the flow of liquid and/or pressured gas.

Preferably in the collapsible bag the flexible compartments are integral and substantially overlying and similarly sized in footprint.

Preferably the maximum volume is substantially in the range of 4 to 12 litres.

More preferably the maximum volume is about 5 litres.

In one form the maximum volume is about 10 litres.

The collapsible bag when collapsed is substantially flat and has end seams at opposing ends such that when full makes a substantially pillow shape, wherein the collapsible bag can be inserted in an advertising cover that can be provided in a flat pack but configured to surround the collapsible bag. The advertising cover can comprise a continuous tube having facets that allow folding and the advertising cover further comprises two end lids shaped to match the facets and of the continuous tube and close respective ends.

Also, in accordance with the invention there is provided a valve for use in a collapsible bag for use in a dispenser wherein the valve includes:

a) a valve comprising:
   i) a lower body part having two peripheral openings fluidly connectable into two separate expandable compartments;
   ii) an upper body mounted into a top part of the lower body and having two outlets connecting to two flow paths each fluidly connected to respective two separate expandable compartments when the upper body is connected to the lower body;
b) a first closure means for
c) a second closure means for The lower body can be mounted on at least one collapsible bag having a first flexible compartment for holding beer and a second flexible compartment forming the two separate expandable compartments, and the upper body can be attached to the lower body.

Preferably the attachment of the upper body and the lower body is selective.

Preferably the attachment of the upper body and the lower body is fixed.

In accordance with the invention there is provided a method of provision of beer including the steps of:

a) Providing a quantity of beer in a collapsible bag having at least one connection to a multi-path valve means A method of provision of beer wherein the step of providing beer in a collapsible bag includes the steps of:

i) Providing bulk beer in heavy duty transportable containers;
ii) Providing a plurality of collapsible bags having structure to allow transport in a substantially flat pack configuration and wherein each collapsible bag is sized to be readily manually carried when filled;
iii) Allowing the plurality of collapsible bags to be filled from the heavy-duty transportable containers.

A method wherein valve structure for valving from beer bag to beer dispenser

The beer dispenser and method of provision of beer can be substantially assembled with improving It can be seen that the invention of beer dispenser and method of provision of beer provides the benefit of It can be seen that the invention provides a multitude of advantages including one or more of:

beer dispenser and the structure of dispenser that allows for dispensing beer from bag of beer
beer bag and structure to allow transport in flat pack
valve structure for valving from beer bag to beer dispenser
valve structure that provides single valve for multichannel connection to allow beer flow separate to pressure gas
method of provision of beer supplied in a beer bag through flat pack
Method and apparatus for refill of beer dispenser with beer bag
Method of control of dispensing
Method of distribution of beer bag in flat pack, then full beer bag separate to gaseous pressure in manually transportable articles then used in transportable dispenser at required location and removal of weight free used empty beer bags.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DESCRIPTION OF PREFERRED EMBODIMENTS

Figure 1:
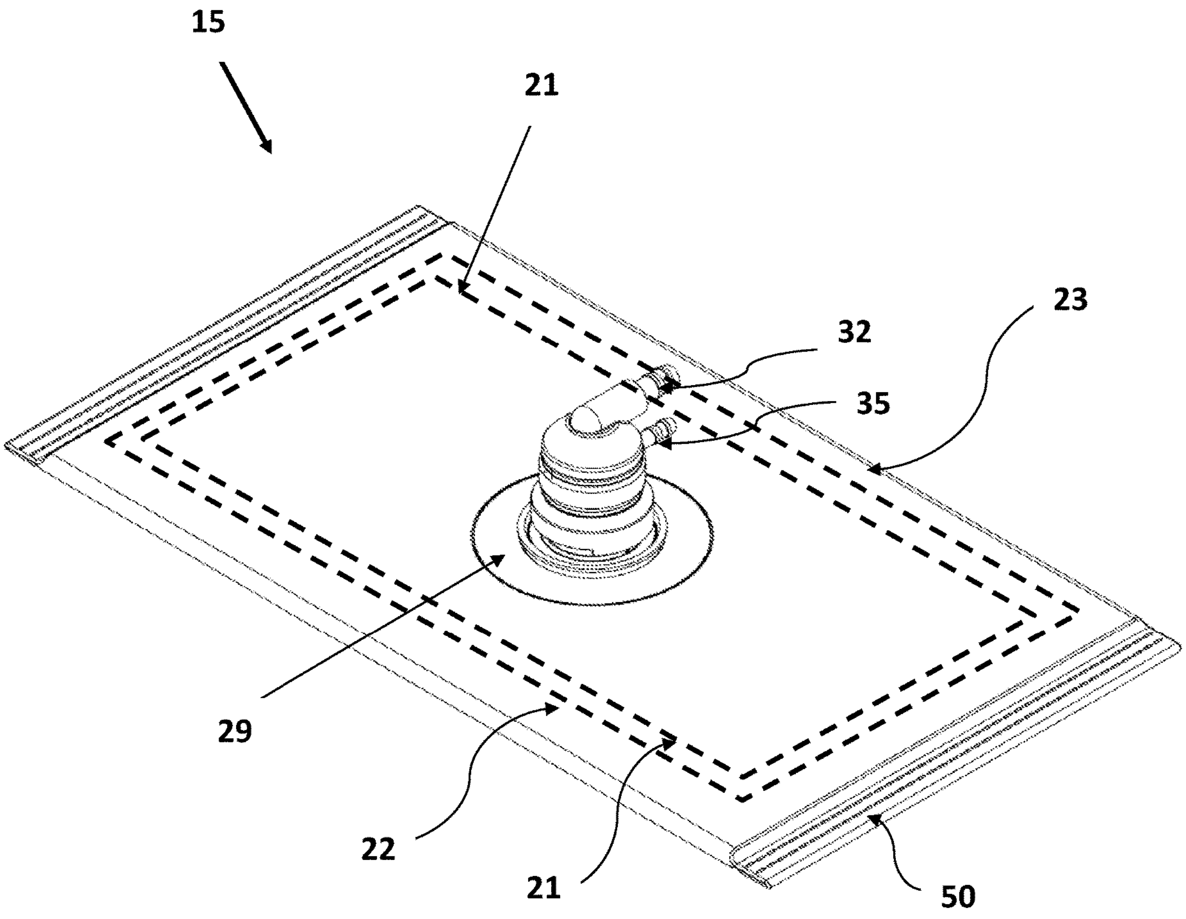
FIG. 1 is a diagrammatic view of a collapsible beer bag in a flatform without an advertising box but with a multichannel valve attached in accordance with an embodiment of the invention.
Figure 2:
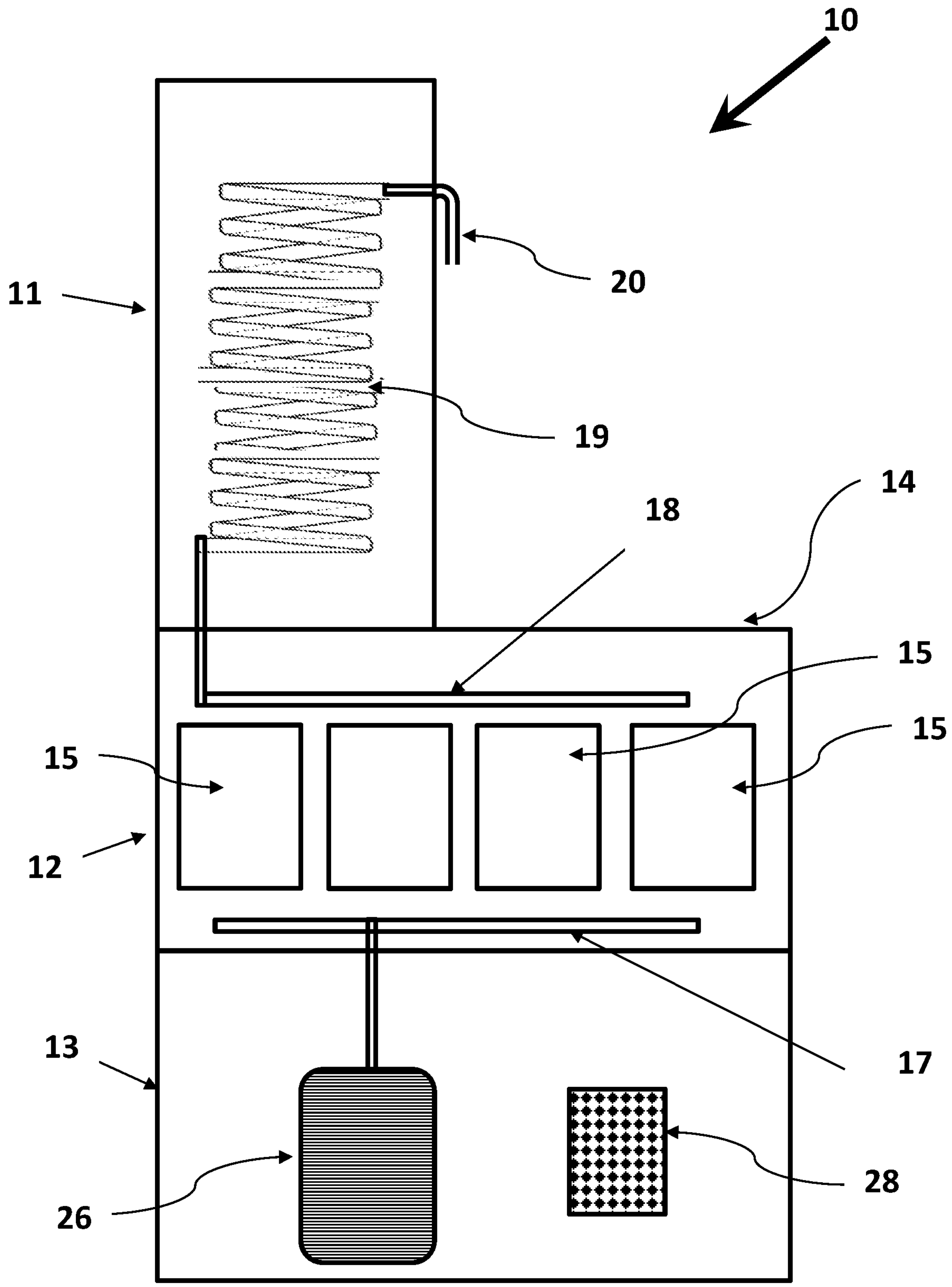
FIG. 2 is a beer dispenser in accordance with a preferred embodiment of the present invention that can be readily relocatable.

It should be noted in the following description that like or the same reference numerals in different embodiments denote the same or similar features.

Referring to FIG. 1 there is one form of the collapsible bag 15 comprising at least three collapsible enclosures 21, 22 and 23. One of the at least three collapsible enclosures forms an outer enclosure 23 and at least two of the at least three collapsible enclosures 21, 22 are within the outer enclosure 23. Each of the at least two collapsible enclosures 21, 22 have respective fluid paths extending from internal 34, 37 to external 32, 35 of the outer enclosure 23.

Figure 3:
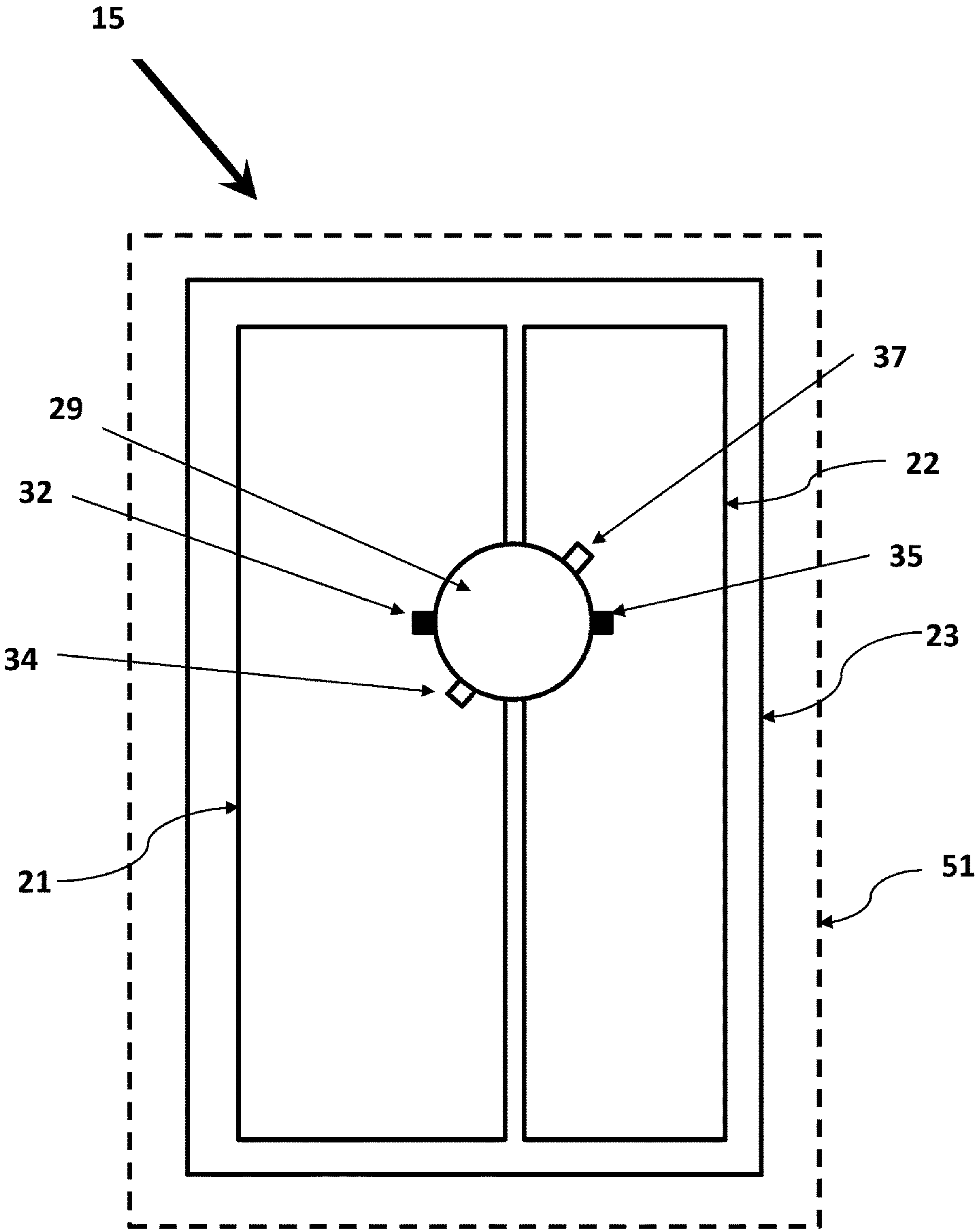
FIG. 3 is collapsible bag for use in a beer dispenser of FIG. 1 in accordance with a preferred embodiment of the present invention.

Preferably the at least two collapsible enclosures are adjacent each other as in FIG. 3 within the outer enclosure. However as in FIG. 1 and in FIG. 4, an alternative form is a first enclosure 21 of the at least two collapsible enclosures is within a second enclosure 22 of the at least two collapsible enclosures and both are within the outer enclosure 23.

The first enclosure 21 of the at least two collapsible enclosures is sized to have an expanded volume similar to an expanded volume of the outer enclosure wherein pressure gas applied into first enclosure 21 will displace liquid in second enclosure 22 for exiting along fluid path to external of the outer enclosure 23.

The collapsible bag has at least part of each of the fluid paths having at least partially concentrically aligned. In this way a single multipath valve 29 can be attached.

Therefore as shown in FIG. 1, the collapsible bag 15 has the at least three collapsible enclosures 21, 22, 23 which collapse flat. In this way the bag is flat when transported, filled in enlarged form and flat when used and being sent for re-using and refilling. Clearly this is in the form where the valve 29 is a snap in valve and can be attached later. The collapsible bag is substantially flat, when the at least three collapsible enclosures are collapsed, and can have end seams 50 at opposing ends such that when full makes a substantially pillow shape.

The outer enclosure has an integrity to hold a pressure within. This outer enclosure can include high tensile synthetic fibre such as Kevlar. The outer enclosure can has an integrity to hold a pressure within of <60 psi. and preferably within of substantially in the range of 35 to 50 psi. The inner enclosure includes an inner layer of FDA approved food safe polyethylene such as Mylar.

The configuration of the collapsible bags and the integrity of the outer enclosure and food quality of an inner enclosure as well as the relative volume of one inner enclosure to the outer enclosures effects the dispensing mechanism of the pressure which can be received in at least one of the at least three collapsible enclosures and the integrity of the outer bag allows transfer of the pressure without fluid interaction to another of the at least three collapsible enclosures. More particularly it also aids in maintaining gaseous pressure of the fluid being dispensed without coming into contact with the fluid.

It can be seen that most beneficially and most inventively is for the valve 29 to be a multi-pathway valve forming a plurality of separate pathways with each pathway forming at least part of one of the fluid paths. In particular, at least part of the fluid paths formed by the valve are at least partially concentrically aligned.

The collapsible bag with the valve forms part of the first fluid path leading to the first enclosure forming a beer compartment of flexible bag; and forms part of the second fluid path leading to the second enclosure forming a pressure compartment of flexible bag. The first enclosure of the at least two collapsible enclosures is sized to have an expanded volume similar to an expanded volume of the outer enclosure wherein pressure gas applied into the first fluid path into the first enclosure will displace liquid in the second enclosure for exiting along second fluid path to external of the outer enclosure and connection to a dispenser.

Referring to the drawings there is shown a beer dispenser 10 that can be readily relocatable. The beer dispenser 10 includes a body having a top dispensing section 11 above a chamber 12 for receiving at least one collapsible bag 15. The dispensing section 11 and the chamber 12 form an L-shape so as to provide a platform 14. A glass can be placed on the platform and fit under a delivery port 20 protruding from an upper portion of the dispensing section. The delivery port can be in the form of a levered tap such as a beer tap.

Below the chamber 12 for receiving at least one collapsible bag 15 is a power supply section 13 for holding the pressure supply 16 and/or the power supply 14 so as to provide effective operation to the dispenser.

Figure 4:
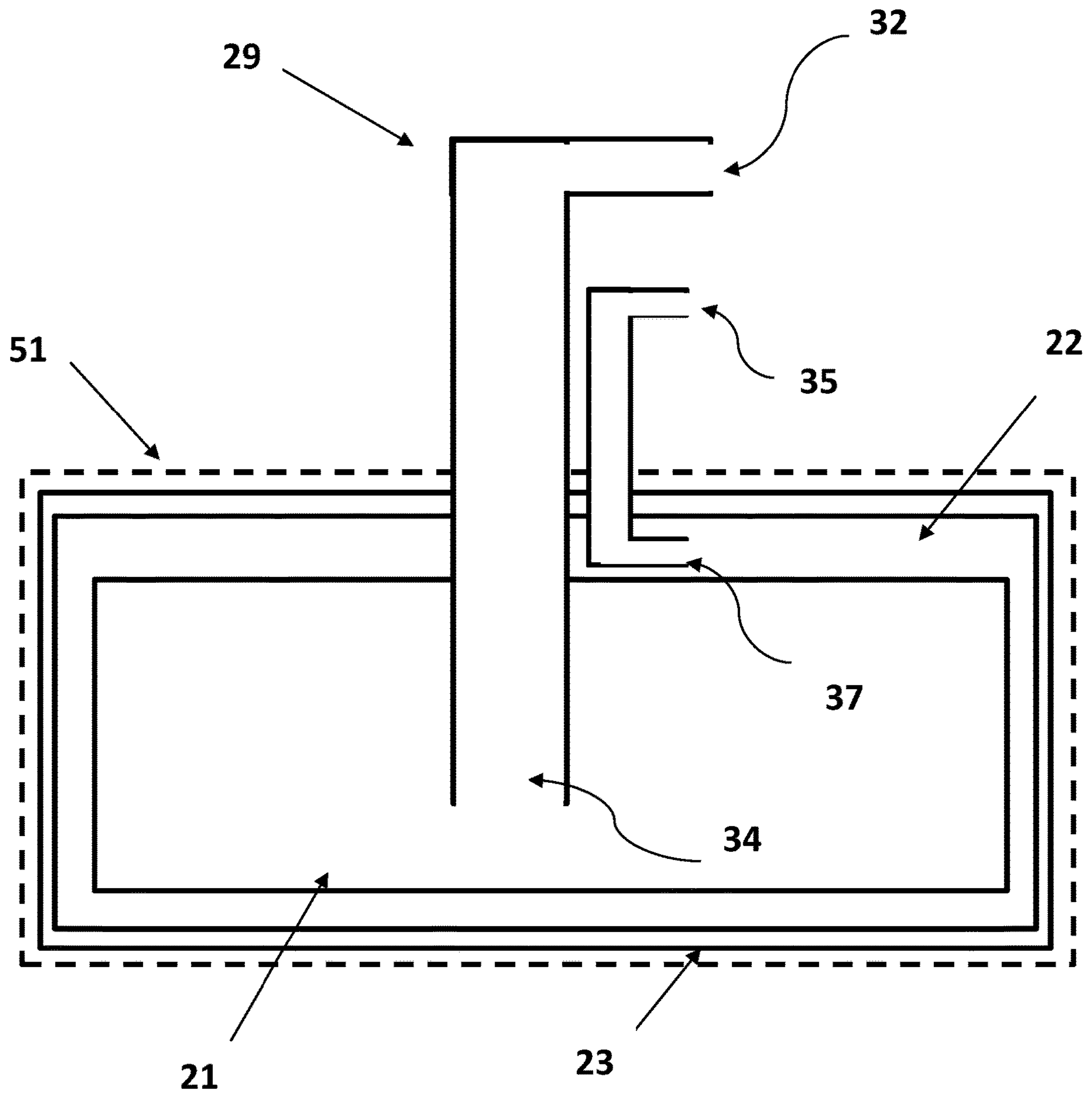
FIG. 4 is a diagrammatic view of fluid pathway operation of the beer bag of FIG. 2 with reference to a multichannel valve in accordance with a preferred embodiment of the present invention.

The at least one collapsible bag 15 as shown in FIG. 3 and FIG. 4 comprises an outer bag 23 in which is a liquid bag 21 and a pressure bag 22. The liquid bag 21 can contain a quantity of liquid such as beer and therefore form a beer bag. The pressure bag 22 is able to receive gas under pressure and thereby exert pressure on the alongside beer bag 21. The outer bag 23 controls the maximum expansion of the beer bag 21 and pressure bag 22 to control excess pressure and to effectively transfer the expansion pressure of the pressure bag 22 to the beer bag 21 while being fluidly separated.

In the particular preferred form of FIG. 4 the liquid bag 21 is inside the pressure bag 22 which is inside the outer bag 23. In this way the pressure bag 22 allows pressure to be applied to all sides of the liquid bag 21 and also allows use of a multichannel valve 29 to be configured inline without having two separate ports.

The multichannel valve 29 has separate channels which are used to access separately the pressure bag 22 and the beer bag 21. The multichannel valve 29 has a first portion 30 that is attached to the various bags of the outer bag 23, beer bag 21 and pressure bag 22. The multichannel valve 31 has a second portion 31 that is external to the bags and provides external ports 32 and 33. Preferably the second part of the multichannel valve 31 is snap fit into the first part 30 in a removable manner.

The multichannel valve 29 has a first fluid pathway from the external port 32 which feeds to internal channel 33 through the centre of the multichannel valve 29 and through to outlet 34 within the beer bag 21. To control flow there is a valve body 44 within this pathway.

The multichannel valve 29 has a second fluid pathway from the external port 35 which feeds to internal channel 36 through the outer circumferential part of the multichannel valve 29 and through to a peripheral outlet 37 within the pressure bag 22.

A particular important element of the multichannel valve is that only one valve structure is required and the three bags 21, 22 and 23 can be attached to the multichannel valve in an operative manner.

The dispenser 10 is able to receive one or a plurality of collapsible bags 15 with a beer bag containing beer within a chamber 12. However the dispenser 10 might in another form not include a dispenser body but only the dispenser connections.

The dispenser 10 includes a connection of a first channel 18 for selective fluid connection of the at least one collapsible bag 15 and more particularly of the beer bag 21 of the at least one collapsible bag 15 by way of the external port 32 of the multichannel valve 29. A delivery port 20 is fluidly connected to the other end of the first channel 18 for allowing selective delivery of beer from the at least one collapsible bag 15 through the first channel 18.

A part of the first channel 18 can be a heat transfer portion 19 which can be helical pathway for passing through or adjacent a cooling substance or cooling structure. In this way the beer when dispensed from the delivery port 20 is chilled.

The dispenser 10 includes a connection of a second channel 17 for selective fluid connection of the at least one collapsible bag 15 and more particularly of the pressure bag 22 of the at least one collapsible bag 15 by way of the external port 35 of the multichannel valve 29. A pressure supply 16 is fluidly connected to the other end of the second channel 17 for allowing exertion of pressure of the pressure bag 22 against the beer bag 21 for selective delivery of beer from the at least one collapsible bag 15 through the first channel 18.

The pressure supply 16 can be a pressurized gas cylinder such that it releases harmless air but under pressure when connected to the inlet 35 for feeding through outlet 37 into the pressure bag 22. Clearly the pressurized gas cylinder can include a check valve for selective opening and selective provision of pressured gas to the second channel 17 to the inlet 35.

In operation the pressurized gas from the pressure supply 16 is fed through the second channel 37 into the pathway into the pressure bag 22. At the same time by passing through the internal channel 36 between the inlet 35 and the outlet 37 in the pressure bag the pressured gas opens the valve 44. In this way the other pathway is open from the beer bag 21 through the internal central channel 33 and out the outlet 32 connected to the first channel 18 through the heat transfer portion 19 to the delivery port 20. The pressure provided by the pressurized gas of the pressure supply exerts pressure on the alongside beer bag 21 within the confines of the outer bag 23 to force the beer from the beer bag 21 to the delivery port 20. This pressured beer remains at the delivery port for as long as the pressure supply is connected to the pressure inlet 35 of the multichannel valve 29.

In use the delivery port 20 being a levered tap stops delivery of the pressured beer until the lever is bent to open the delivery port and allow dispensing of the beer preferably into glasses on or above the dispensing platform 14.

Figure 5:
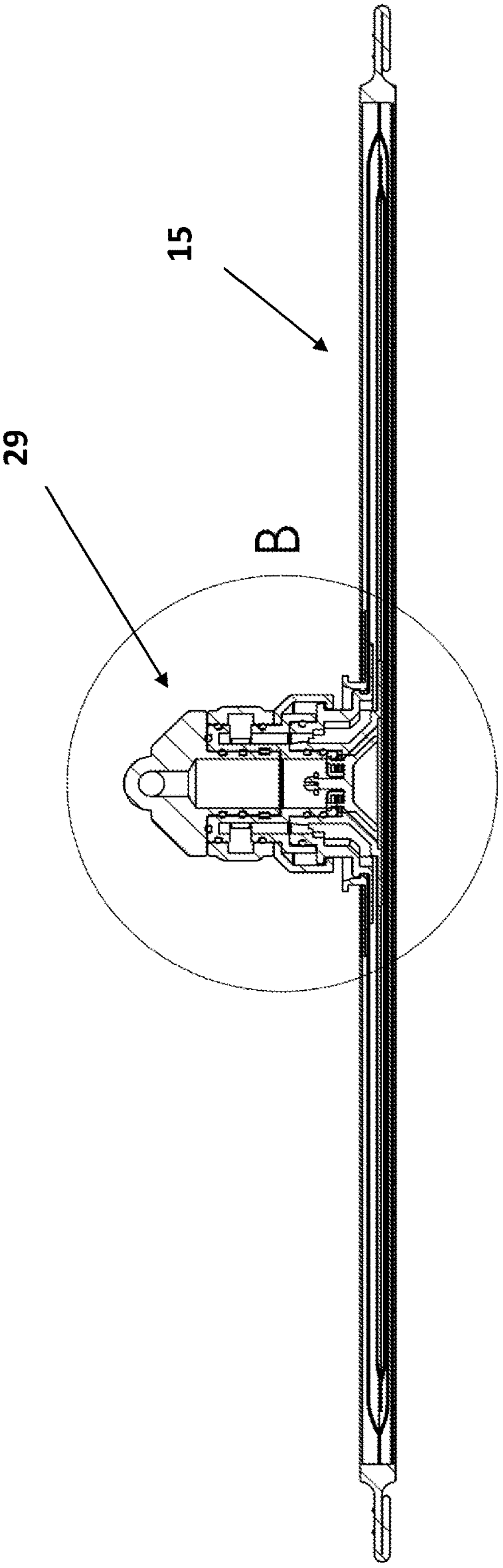
FIG. 5 is a diagrammatic cross-sectional view of a collapsible bag in flatform with a multichannel valve for use in a beer dispenser of FIG. 1 in accordance with a preferred embodiment of the present invention.
Figure 6:
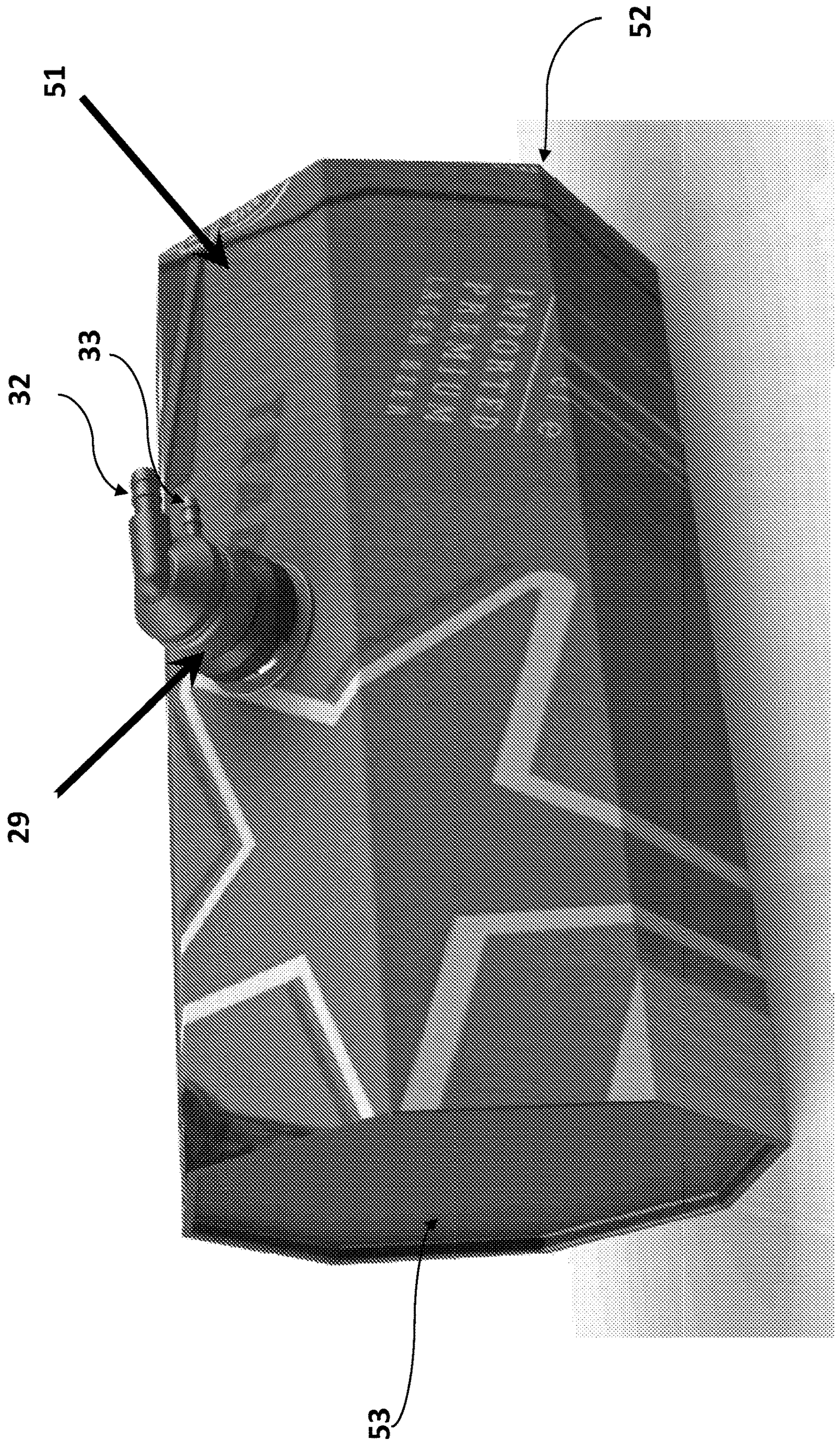
FIG. 6 is a collapsible beer bag in a constructed form able to be full of beer and in an advertising box matching the beer and with a multichannel valve attached in accordance with an embodiment of the invention for use in a dispenser in accordance with an embodiment of the invention.
Figure 7:
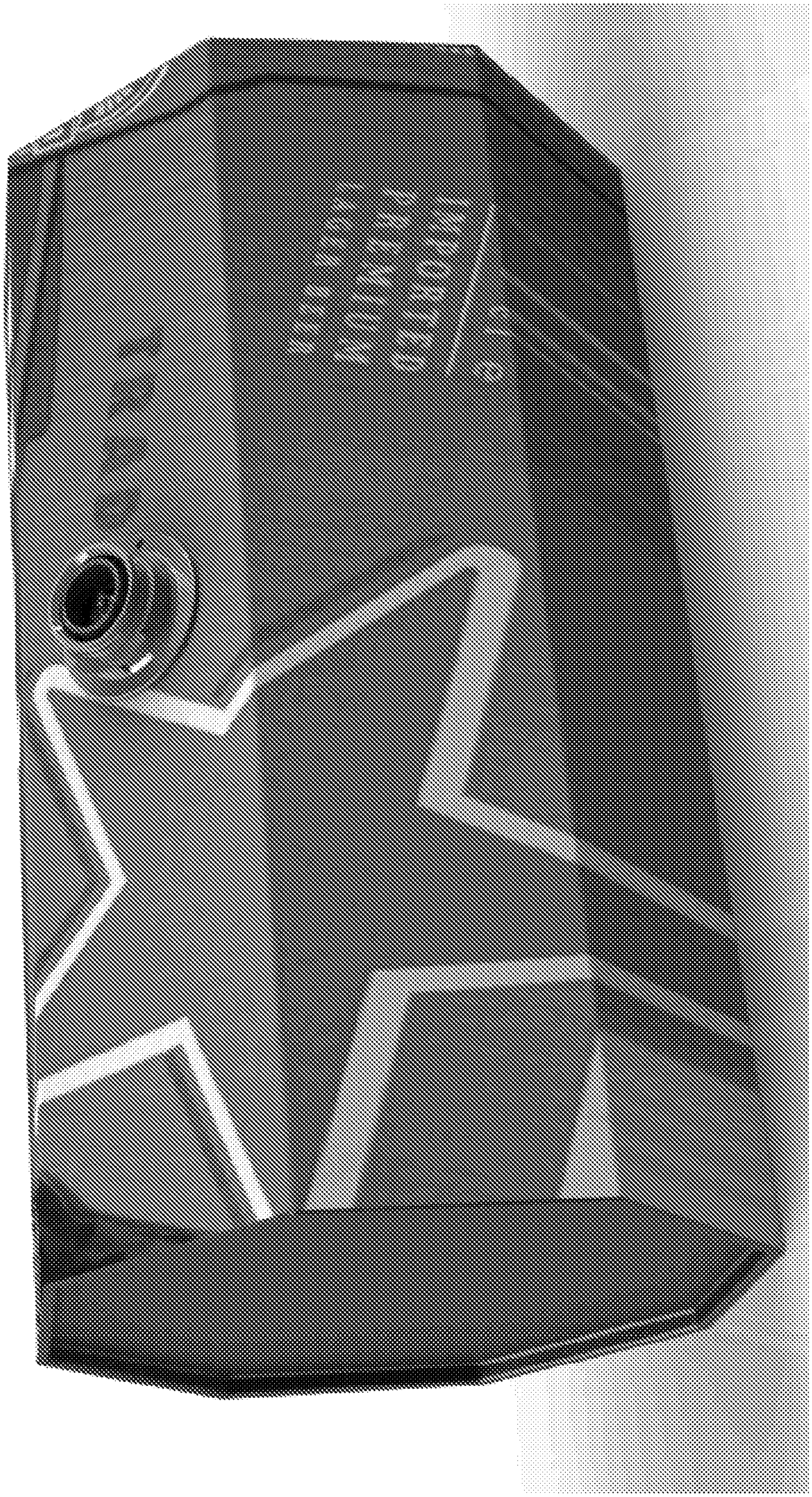
FIG. 7 is a collapsible beer bag in an advertising box with only a first part of a multichannel valve attached in accordance with an embodiment of the invention for use in a dispenser in accordance with an embodiment of the invention.
Figure 8:
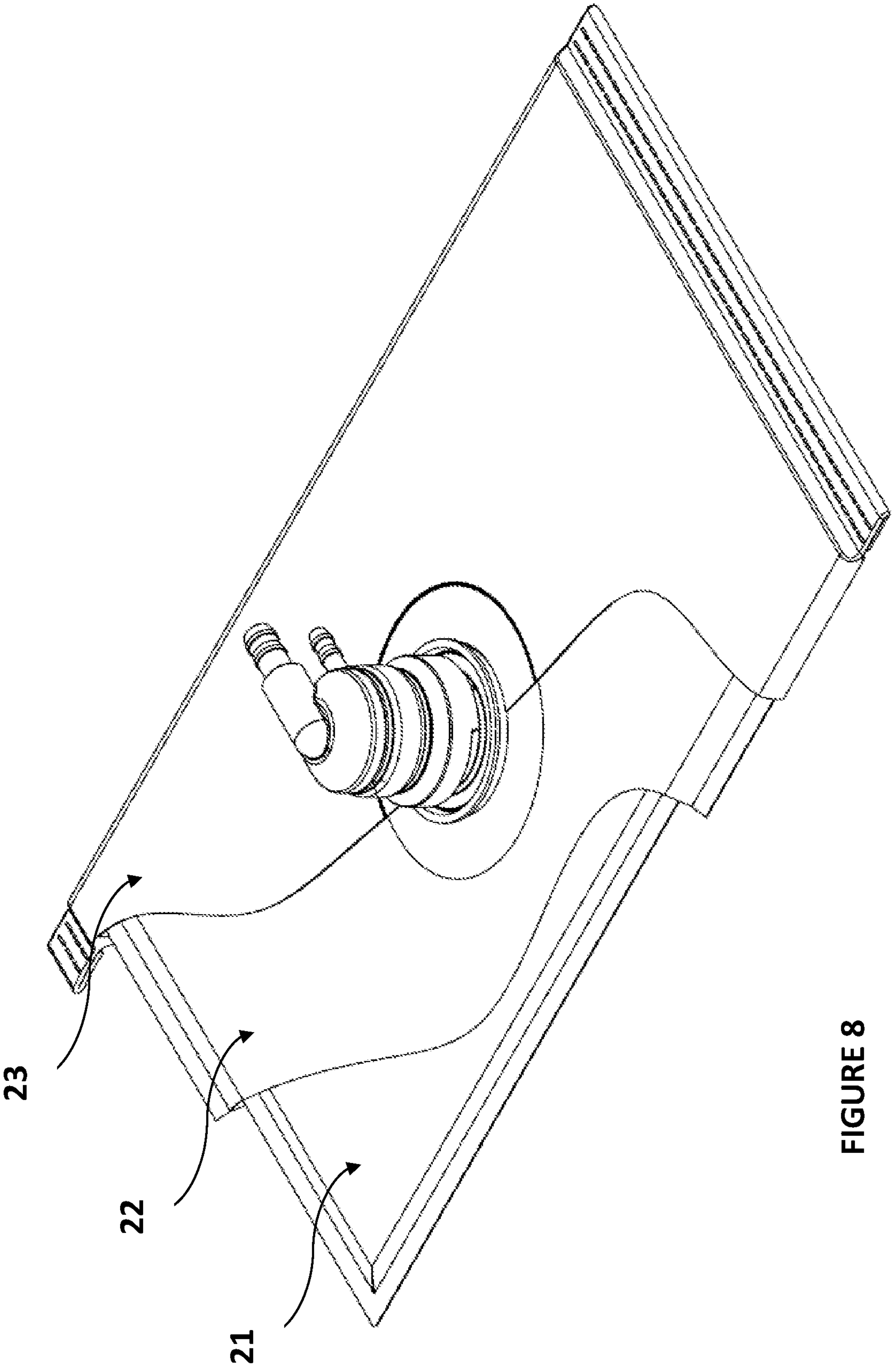
FIG. 8 is a diagrammatic cutaway of FIG. 7 showing the internal bags within the external bag with all attached to the multichannel valve attached in accordance with an embodiment of the invention.
Figure 9:
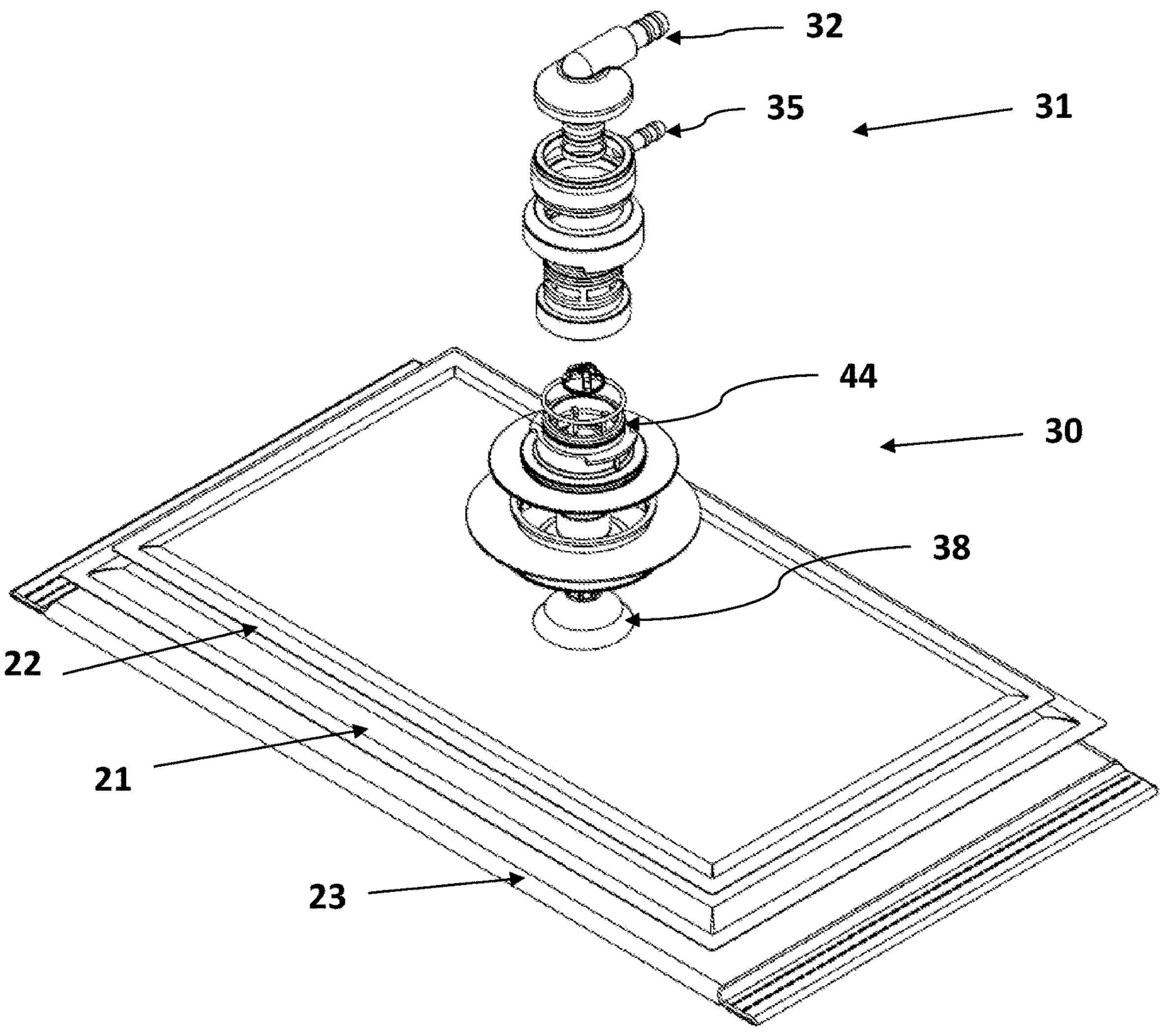
FIG. 9 is a perspective exploded diagrammatic view of a collapsible beer bag in a flatform with a multichannel valve attached in accordance with an embodiment of the invention.
Figure 10:
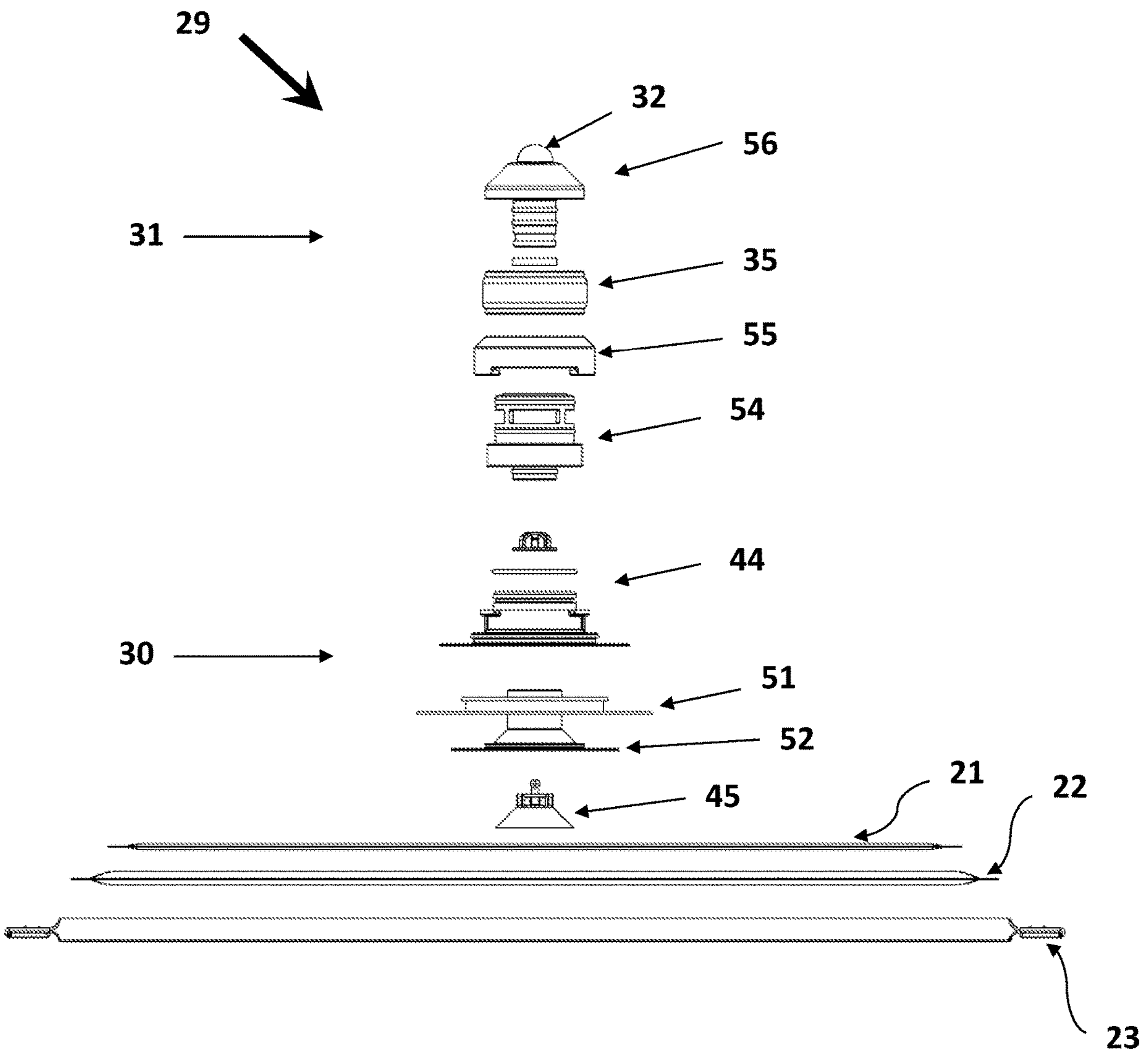
FIG. 10 is a side elevation exploded diagrammatic view of a collapsible beer bag in a flatform with a multichannel valve attached in accordance with an embodiment of the invention.
Figure 11:
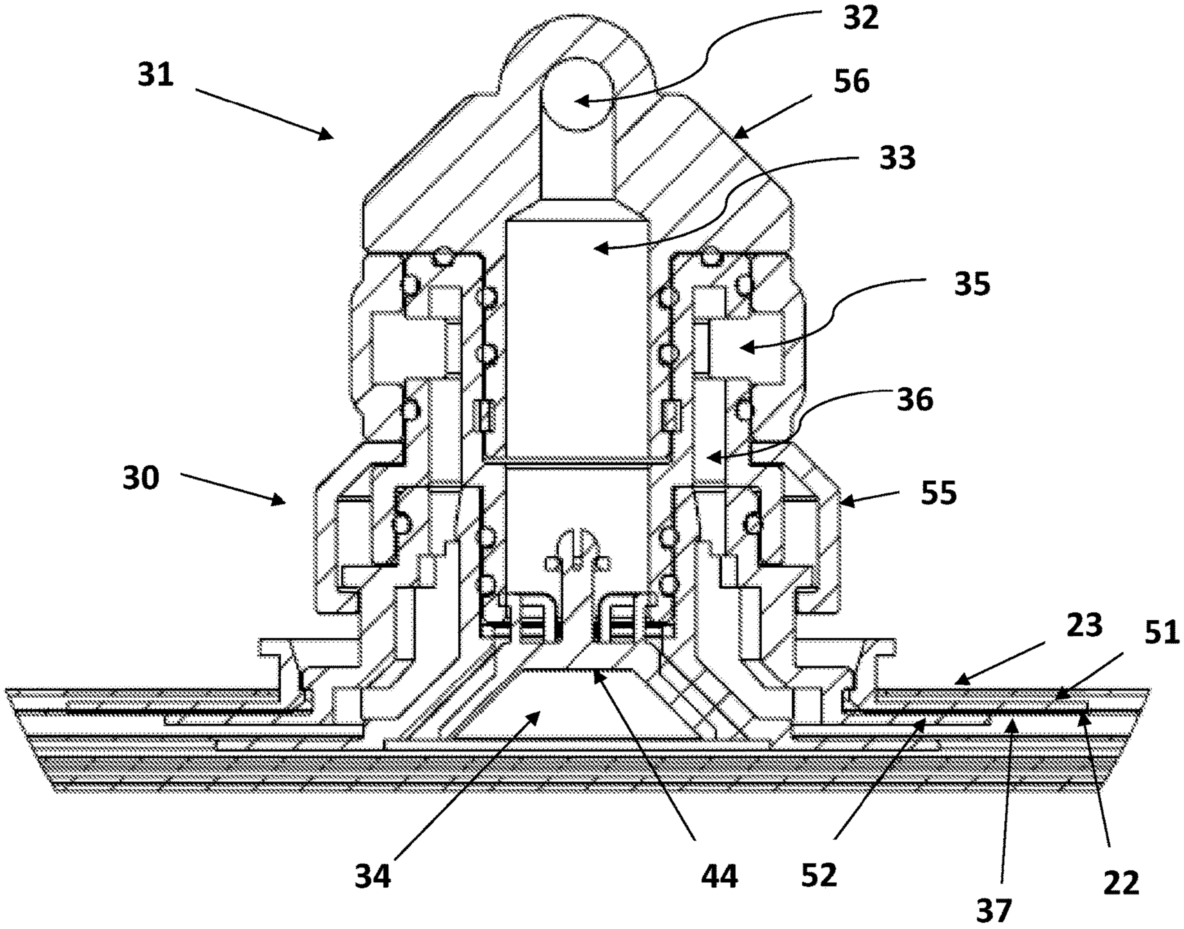
FIG. 11 is a cross sectional view of a multichannel valve attached to flatform of collapsible bag being detail B of FIG. 4 in accordance with an embodiment of the invention.
Figure 12:
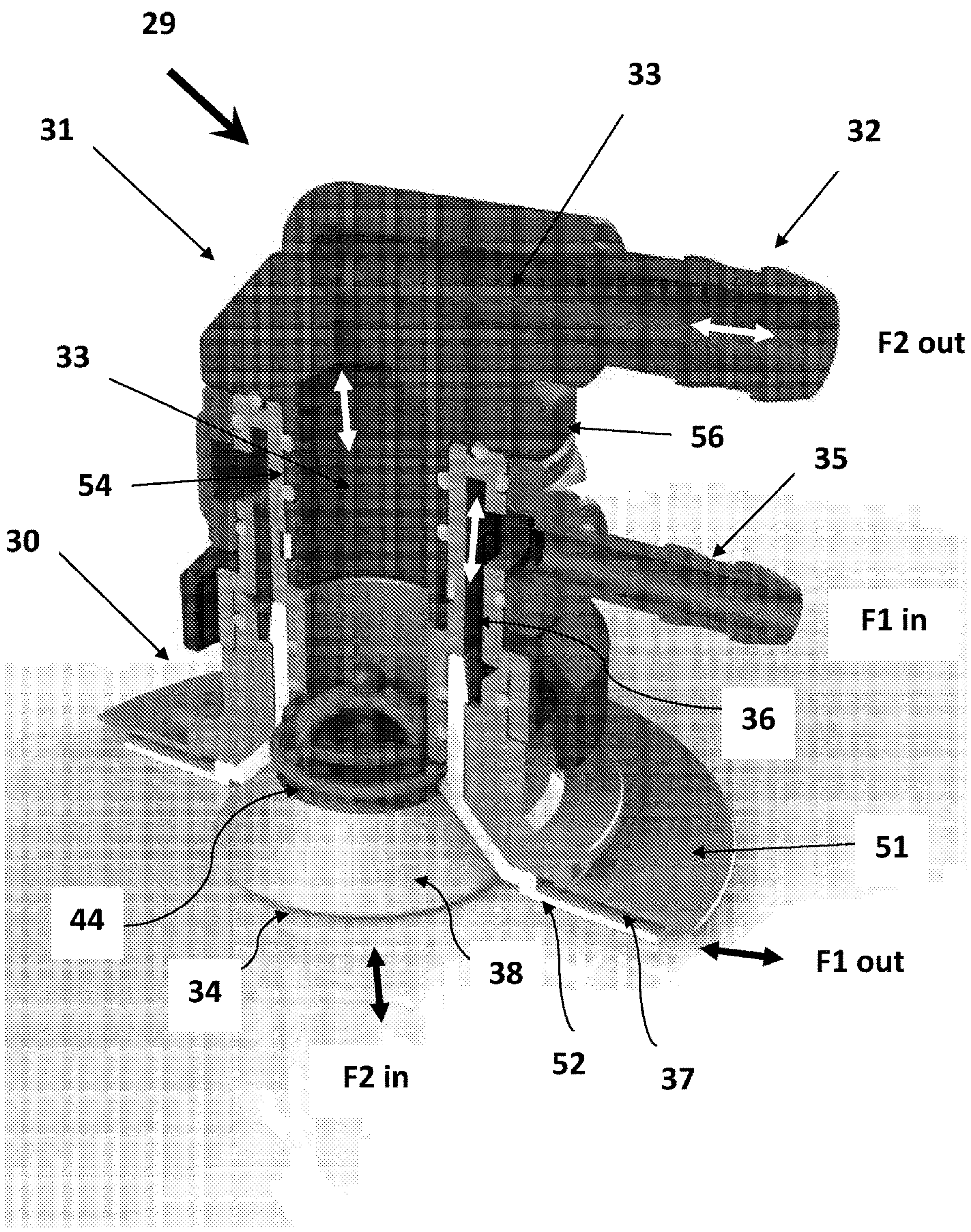
FIG. 12 is a cutaway view of a multichannel valve in accordance with an embodiment of the invention.
Figure 13:
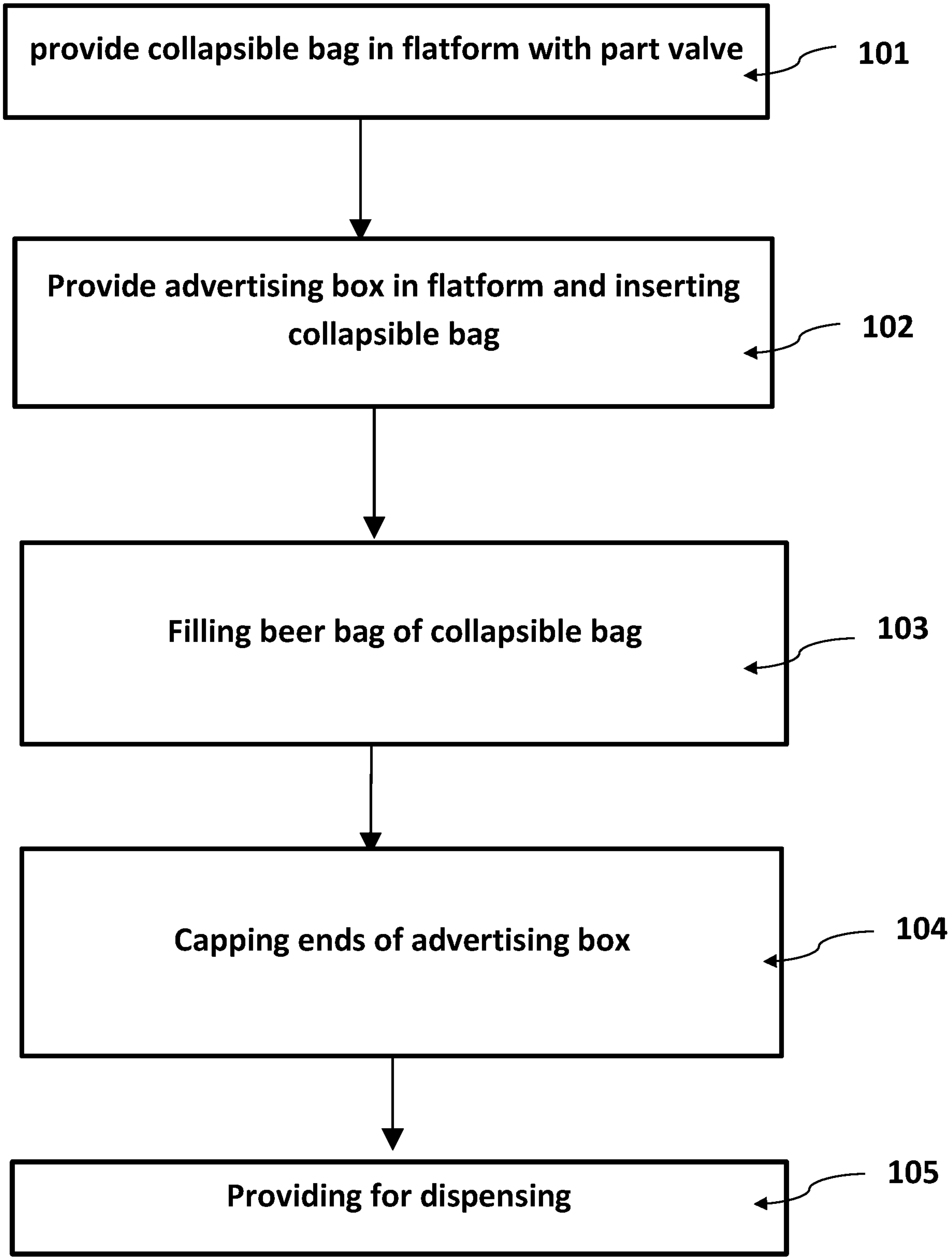
FIG. 13 is a diagrammatic flow diagram of the method of supplying of beer for dispensing using the collapsible bag in accordance with an embodiment of the invention.
Figure 14:
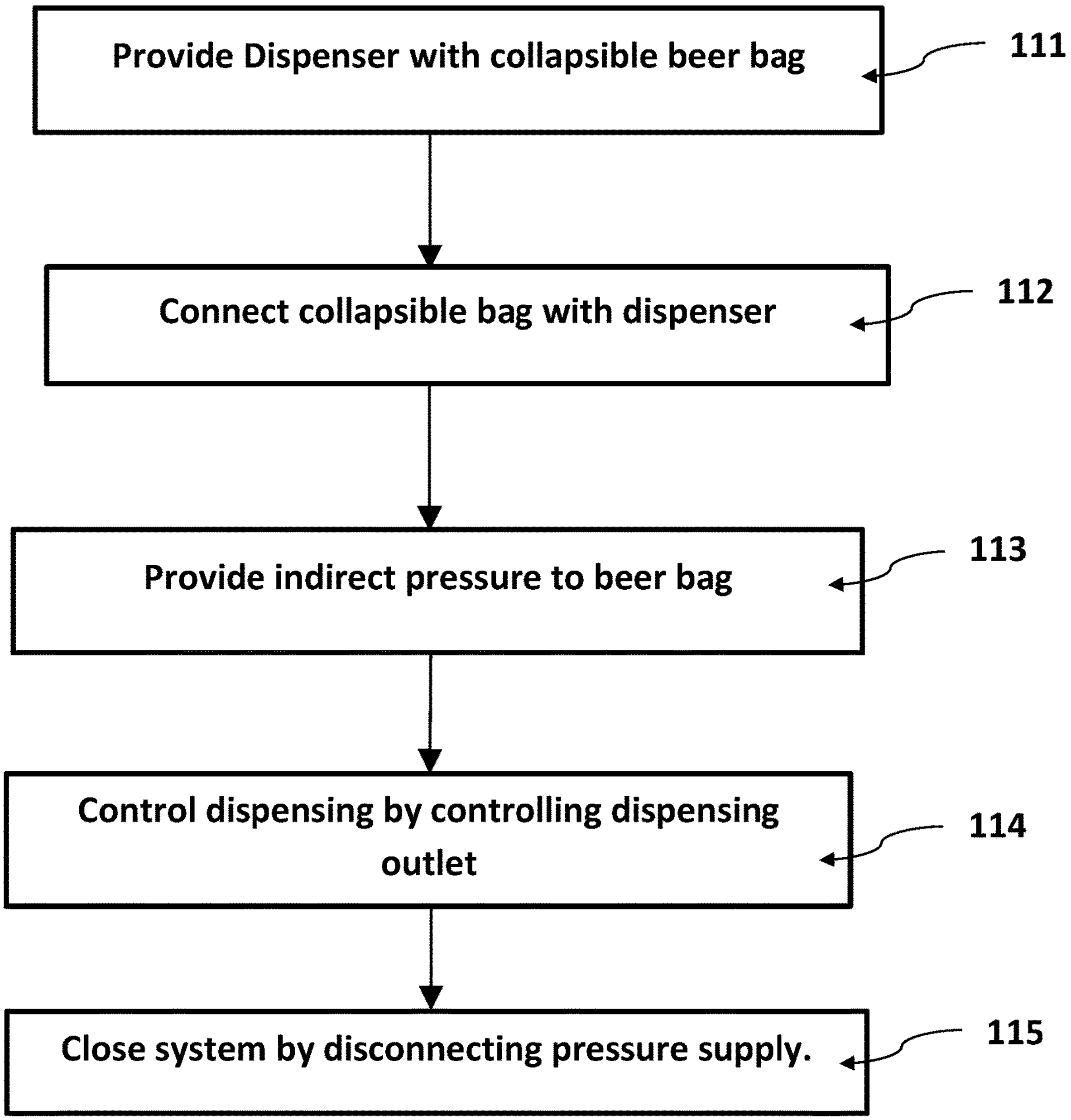
FIG. 14 is a diagrammatic flow diagram of the method of supplying of beer for dispensing of the supplied beer in the collapsible bag in accordance with an embodiment of the invention.

With reference to the drawings the multichannel valve 29 can be seen in more detail in FIGS. 8 to 12. The valve has two parts. A first part 30 is attached to the collapsible bag 15 but it is attached to the particular beer bag 21, pressure bag 22 and restraining outer bag 23 in such a way to allow the flow paths as shown in FIG. 3. The two parts 30, 31 of the valve 29 also allow for transport without connection of the second part 31 in the form of FIG. 6 (with possibly a snap in top closure—not shown) and have the second part 31 being snapped into the first part when ready for use such as in FIG. 5.

The first part 30 of the valve 29 includes a valve body 44 having a central passage that aligns with a central passage 33 of the top body portion 56 having the outlet 32. The first part 30 also includes a valve plug 45 for interacting with the valve body 44 to selectively close the central channel.

A further portion of the first part includes a skirt 51 extending from a central body encircling the central passage 33. A second skirt 52, which is spaced relative to the first skirt 51, is mounted parallel thereto and extends from a body which also encircles the central passage 33 but is inner to the body of the first skirt 51. The relative spacing of the second skirt to the first skirt 51 provides a radially extending pathway 37 fluidly separate to the inner central channel.

The second part 31 of the valve 29 includes a top body portion 56 having a central channel 33 fitting to a middle body portion 54 and having the first external outlet 32 with its channel 33 extending radially at 90 degrees to the main vertical central channel. Around the middle body portion 54 is a body that encircles the central channel 33 of the top body portion 56 and which has an outer wall that forms one wall of an annular ring passage. A ring body that includes the other external outlet 35 extending radially outward has at an inner side a wall that opposes the wall of the middle body portion 54 and completes the annular ring passage. This passage connects from the other external outlet 35 through annular channel and connecting downwards to fluidly connect with the radially extending outlet 37 between the two skirts 51 and 52.

Therefore, the multichannel valve 29 with first and second parts 30, 31 form a first fluid pathway leading from outlet 32 through central channel 33 down to central outlet, pass valve 44 to central outlet 34. It also forms a second fluid pathway The connection of the beer bag 21, pressure bag 22 and outer bag 23 forming the collapsible bag 15 are achieved by connection to the first and second skirts 51, 52. The pressure bag 22 has a round top opening that fits around the central body of the first skirt 51 and is attached to the top surface of the annular plate of the first skirt.

In the form shown in FIG. 4 the beer bag 21 is within the pressure bag 22 which is within the containing bag 23 with the pressure being fed into external outlet 35 through annular ring channel 36 out outlet 37 along first fluid path. The first enclosure of the at least two collapsible enclosures is sized to have an expanded volume similar to an expanded volume of the outer enclosure wherein pressure gas applied into the first fluid path into the first enclosure will displace liquid in the second enclosure for exiting along second fluid path to external of the outer enclosure and connection to a dispenser.

In the form shown in FIG. 3 the beer bag 21 and pressure bag 22 are adjacent but both within the outer bag 23 to retain the inner bags but be still fed through the two separate fluid pathways.

INTERPRETATION

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the beverage and drink service industries.

The invention claimed is:

1. A collapsible bag comprising:

at least three collapsible enclosures, wherein one of the at least three collapsible enclosures forms an outer enclosure and at least two of the at least three collapsible enclosures are within the outer enclosure, wherein each of the at least two collapsible enclosures have respective fluid paths extending from external of the outer enclosure at a common outlet of the outer enclosure, wherein a second enclosure of the at least two collapsible enclosures is sized to have an expanded volume equal to an expanded volume of the outer enclosure wherein pressure gas applied into the second enclosure will displace liquid in a first enclosure of the at least two collapsible enclosures for exiting along a fluid path to external of the outer enclosure.

2. A collapsible bag according to claim 1 wherein the at least two collapsible enclosures are adjacent each other within the outer enclosure.

3. A collapsible bag according to claim 1 wherein the first enclosure of the at least two collapsible enclosures is within the second enclosure of the at least two collapsible enclosures and both the first enclosure and the second enclosure are within the outer enclosure.

4. A collapsible bag according to claim 1 wherein at least part of each of the fluid paths are at least partially concentrically aligned.

5. A collapsible bag according to claim 1 wherein the at least three collapsible enclosures collapse flat, the collapsible bag being flat, when the at least three collapsible enclosures are collapsed, and has end seams at opposing ends such that when full makes a pillow shape.

6. A collapsible bag according to claim 1 wherein the outer enclosure has an integrity to hold a pressure within of <60 psi wherein the pressure can be received in at least one of the at least three collapsible enclosures and the integrity of the outer bag allows transfer of the pressure without fluid interaction to another of the at least three collapsible enclosures.

7. A collapsible bag according to claim 1 wherein the fluid paths are formed at least partly by a valve.

8. A collapsible bag according to claim 1 wherein the fluid paths are formed to receive a valve.

9. A collapsible bag according to claim 1 wherein the fluid paths are formed integral with a valve.

10. A collapsible bag according to claim 1 wherein the valve is a multi-pathway valve forming a plurality of separate pathways with each pathway forming at least part of one of the fluid paths, wherein at least part of the fluid paths formed by the valve are at least partially concentrically aligned.

11. A collapsible bag according to claim 10 wherein the valve forms part of a first fluid path leading to the first enclosure forming a beer compartment of flexible bag; and forms part of a second fluid path leading to the second enclosure forming a pressure compartment of flexible bag.

12. A collapsible bag according to claim 10 wherein the valve includes:

a. a lower body part having two peripheral openings fluidly connectable into two separate expandable compartments;

b. an upper body mounted into a top part of the lower body and having two outlets connecting to two flow paths each fluidly connected to respective two separate expandable compartments when the upper body is connected to the lower body;

c. a first passage for feeding a pressure gas into a flexible pressure bag adjacent to or surrounding a liquid bag holding the gaseous drink to be dispensed; and d. a second passage for selectively feeding the gaseous drink from the liquid bag, wherein the multichannel valve is configured inline allowing the pressure gas to be fed through the first passage to pressure bag to apply pressure to sides of the liquid bag and allowing dispensing of the liquid through the second passage.

13. A valve according to claim 12 wherein the lower body can be mounted on at least one collapsible bag having a first flexible compartment for holding beer and a second flexible compartment forming the two separate expandable compartments, and the upper body can be attached to the lower body.

* * * * *